(12) United States Patent
Berg

(10) Patent No.: US 7,032,682 B2
(45) Date of Patent: Apr. 25, 2006

(54) UNMANNED VEHICLE FOR DISPLACING MANURE

(75) Inventor: Karel van den Berg, Bleskensgraaf (NL)

(73) Assignee: Lely Research Holding AG, Zug (CH)

( * ) Notice: Subject to any disclaimer, the term of this patent is extended or adjusted under 35 U.S.C. 154(b) by 0 days.

(21) Appl. No.: 09/764,292

(22) Filed: Mar. 14, 2001

(65) Prior Publication Data

US 2003/0020243 A1    Jan. 30, 2003

Related U.S. Application Data

(63) Continuation of application No. PCT/NL00/00313, filed on May 10, 2000.

(30) Foreign Application Priority Data

May 25, 1999 (NL) .................................. 1012142

(51) Int. Cl.
 *A01B 63/00* (2006.01)
(52) U.S. Cl. .............................. 172/5; 15/49.1; 15/319; 15/98; 15/340.1; 15/340.3; 180/168; 180/274
(58) Field of Classification Search ................. 15/49.1, 15/93.1, 319, 98, 340.1, 340.3; 180/167, 180/168, 274; 172/5
See application file for complete search history.

(56) References Cited

U.S. PATENT DOCUMENTS

| 2,966,256 A | 12/1960 | McLeland ............ 198/224 |
| 3,939,518 A * | 2/1976 | Whitney et al. |
| 4,306,329 A * | 12/1981 | Yokoi |
| 4,482,960 A * | 11/1984 | Pryor |
| 4,751,658 A | 6/1988 | Kadonoff et al. ........... 364/513 |
| 4,815,008 A | 3/1989 | Kadonoff et al. ........... 364/513 |
| 4,910,824 A * | 3/1990 | Nagayama et al. |
| 5,109,566 A | 5/1992 | Kobayashi et al. ........... 15/319 |
| 5,208,521 A * | 5/1993 | Aoyama |
| 5,279,012 A * | 1/1994 | Sloan |
| 5,279,672 A * | 1/1994 | Betker et al. |
| 5,309,592 A * | 5/1994 | Hiratsuka |
| 5,444,893 A | 8/1995 | Hwang et al. ............. 15/319 |
| 5,507,058 A * | 4/1996 | Minami et al. |

(Continued)

FOREIGN PATENT DOCUMENTS

DE        1109441        6/1961

(Continued)

OTHER PUBLICATIONS

Wikipedia, The Free Encyclopedia: Inertial Guidance System (Internet: Feb. 20, 2005).

(Continued)

Primary Examiner—Victor Batson
(74) Attorney, Agent, or Firm—Penrose Lucas Albright

(57) ABSTRACT

An unmanned vehicle for displacing manure in a stable or field which comprises a steering unit for steering the vehicle and a frame. Two wheels and a manure displacing blade which depend from the frame provide the entire support for the vehicle, the vehicle's center of gravity being in an axis which falls between the wheels and the blade. A freely turnable circular bumper is also carried by the frame and prevents the vehicle from colliding with obstacles in the area wherein it operates. The vehicle also includes orientation and steering components as well as sensors for controlling the course of travel of the vehicle within the area and, such as the circular bumper, to prevent it from colliding with obstacles in the area.

55 Claims, 2 Drawing Sheets

U.S. PATENT DOCUMENTS 5,534,762 A * 7/1996 Kim
5,561,883 A * 10/1996 Landry et al.
5,569,371 A * 10/1996 Perling
5,581,034 A    12/1996 Dao et al. ................. 73/514.09
5,808,197 A     9/1998 Dao ......................... 73/514.09
6,141,810 A * 11/2000 Allen et al.
6,237,530 B1 *  5/2001 van der Lely et al.
6,299,699 B1 * 10/2001 Porat et al.

FOREIGN PATENT DOCUMENTS

| | | |
|---|---|---|
| DE | 1183301 | 12/1984 |
| DE | 4425924 A1 | 1/1996 |
| EP | 0142594 A1 | 5/1985 |
| EP | 0402764 A2 | 12/1990 |
| EP | 0943235 A2 | 3/1999 |
| WO | WO97/31524 | 9/1997 |

OTHER PUBLICATIONS

The Illustrated Science and Invention Encyclopedia: How It Works, vol. 10, Inertial Guidance, pp. 1258-1261 (1983).

* cited by examiner

UNMANNED VEHICLE FOR DISPLACING MANURE

RELATED APPLICATION

This application is a Continuation Application of International Application No. PCT/NL00/00313, filed May 10, 2000.

FIELD OF THE INVENTION

This invention relates to an unmanned vehicle for displacing manure.

BACKGROUND OF THE INVENTION

Modern stables have a stable floor which is provided with apertures that receive through them cow manure. A receptacle is provided under the stable floor in which manure that passed therethrough is collected. Generally there is also provided in the stable a so-called manure slide which moves through the stable at predetermined times and displaces the manure partially to the dung pit and partially through the apertures in the stable floor.

A new development is an unmanned vehicle for displacing manure. Such a vehicle is known from, for example, Messrs. Joz B. V. as the JOZTECH (Landbouw Rai (Agricultural Rai), Amsterdam, January 1999). This vehicle is provided with a propelling unit comprising two freely rotatable wheels and one driven and controllable wheel. The disadvantage of said vehicle is that the construction of the driven and controllable wheel is complicated and therefore expensive. Moreover, the vehicle is very sensitive to dirt, which is not desirable in an environment such as a stable. Furthermore, the JOZTECH is driven by only one controllable wheel, whereby wheel skidding often occurs on the stable floor which is very slippery due to the presence of manure. As a result thereof it is not possible to determine the exact position of the vehicle on the basis of the number of revolutions of the driven wheel. Finally, the manure slide exerts relatively little pressure on the stable floor so that not all the manure is displaced by the manure slide and part of the manure moves und4er the lower side thereof.

SUMMARY OF THE INVENTION

An object of the invention is to obviate the above-mentioned drawbacks by fitting the manure displacement means to the unmanned vehicle so it is indispensable for supporting or propelling the vehicle or both. The invention further relates to an unmanned vehicle wherein its steering comprises a propelling unit that includes at least one propelling member. The advantage of this unmanned vehicle is that the manure displacement means forms part of the supporting means, as a result of which a considerable part of the weight of the unmanned vehicle always bears on the manure displacement means, whereby sufficient pressure always bears against the stable floor, whereupon the manure is effectively displaced over the stable floor and is received through the apertures in a stable floor. Moreover, the drive unit of the propelling members also constitutes the steering unit of the unmanned vehicle. Accordingly, a compact construction is achieved which is insensitive to dirt and which, in addition, is less complicated thus reducing manufacturing costs.

According to an inventive feature, the unmanned vehicle comprises a steering unit which is constituted by the propelling unit which comprises at least one rotatable propelling member. In this manner a particularly compact vehicle is provided which has excellent maneuverability. According to another embodiment of the invention, the vehicle comprises a steering unit which is constituted by the propelling unit which comprises at least two independently driven propelling members. In this embodiment maneuverability of the vehicle is possible by varying the peripheral velocities of the propelling members. The propelling members may comprise a wheel or a caterpillar track or both. Caterpillar tracks have the advantage of being less sensitive to skidding than wheels.

In accordance with another inventive feature, the unmanned vehicle is equipped with orientation means for following a path in a space for determining the position of the vehicle in a space, such as a stable or a meadow. The orientation means comprise floor detection means for detecting apertures in the floor or detecting a guidance means in the floor, such as the reinforcement in the concrete or an electricity conducting wire or a combination thereof. The apertures in the floor are usually provided for removing the manure as described above. When the stable floor is made of concrete, there is usually a metal grid in the floor to give it extra strength. Said grid can be detected by means of the floor detection means with the aid of, for example, an induction coil. Additional orientation means may comprise a compass or a gyroscope or an air level or a clinometer or an accelerometer, or a combination thereof. These orientation means are currently available in a form which is suitable for being applied in electronic circuits, so that integrated orientation means can easily be assembled from the various components.

Besides, the orientation means also comprises wall following means for detecting and following a wall, such as a fixed stable wall or the edge of a cubicle. These wall following means extend over at least part of the circumference of the unmanned vehicle. The wall following means may also be disposed on the manure displacing means. In a preferred embodiment, the wall following means consists of a freely rotating substantially round element, such as preferably a wheel or a disc or a sphere or a combination thereof.

Furthermore, the invention relates to an unmanned vehicle which is equipped with orientation means for following a path in a space or determining a position of the vehicle in a space, such as a stable or a meadow. It will be appreciated, moreover, that the unmanned vehicle is not only capable of being used for displacing manure, but also for other activities, such as spreading material, such as sawdust and straw, determining and controlling the climate in the stable, and determining the behavior and health of the animals. For that purpose the unmanned vehicle is equipped with orientation means comprising floor detection means for detecting apertures in the floor or detecting a guidance means in the floor, such as the reinforcement in the concrete or an electricity conducting wire or for detecting a combination thereof. Moreover, the orientation means may also comprise a compass or a gyroscope or an air level or a clinometer or an accelerometer or a combination thereof. The orientation means may also comprise well following means for detecting and following a wall, such as a fixed stable wall or the edge of a cubicle. The wall following means extend preferably over at least part of the circumference of the unmanned vehicle. The wall following means may also be disposed on the manure displacement means. The wall following means may consist of a freely rotating, substantially round element. The round element is preferably constituted by a wheel or a disc or a sphere or a combination thereof.

According to another inventive feature, the unmanned vehicle is equipped with protective facilities for protecting the vehicle from colliding with obstacle, such as the legs of cows, or fixed objects, such as supporting pillars in the stable.

The protective facilities may comprise a bumper or a sensor for detecting cows, or both. The protective facilities may also comprise wall following means or positioning means for determining the position of an obstacle relative to the unmanned vehicle. The positioning means may comprise a clinometer or an accelerometer or both. The positioning means are preferably disposed on the wall following means. In this manner it is possible to determine the angular deflection and angular acceleration of, for example, the wall following means, so that information is obtained regarding the position of the obstacle. The signal from the positioning means is used for actuating the steering unit.

The manure displacement means preferably comprises at least one brush or at least one manure slide or at least one spraying unit or a combination thereof.

In accordance with a yet further inventive feature, the unmanned vehicle is equipped with anti-bumping means for preventing the manure displacement means from moving too far away from the floor. The anti-bumping means comprises a bumper or a bracket or both. The anti-bumping means preferably comprises an anti-bumping sensor for detecting the movement of the manure displacement means relative to the floor, which anti-bumping sensor is coupled to be propelling unit. Such anti-bumping sensor may consist of a switch which is disposed on the bumper or bracket. When the manure slide moves too far away from the stable floor, the switch touches the stable floor, whereupon the unmanned vehicle is caused to move in an opposite direction until all its supporting means bear on the stable floor.

BRIEF DESCRIPTION OF THE DRAWINGS

The invention will now be explained in further detail with reference for the accompanying drawings.

DETAILED DESCRIPTION OF THE PREFERRED EMBODIMENTS

Figure 1:
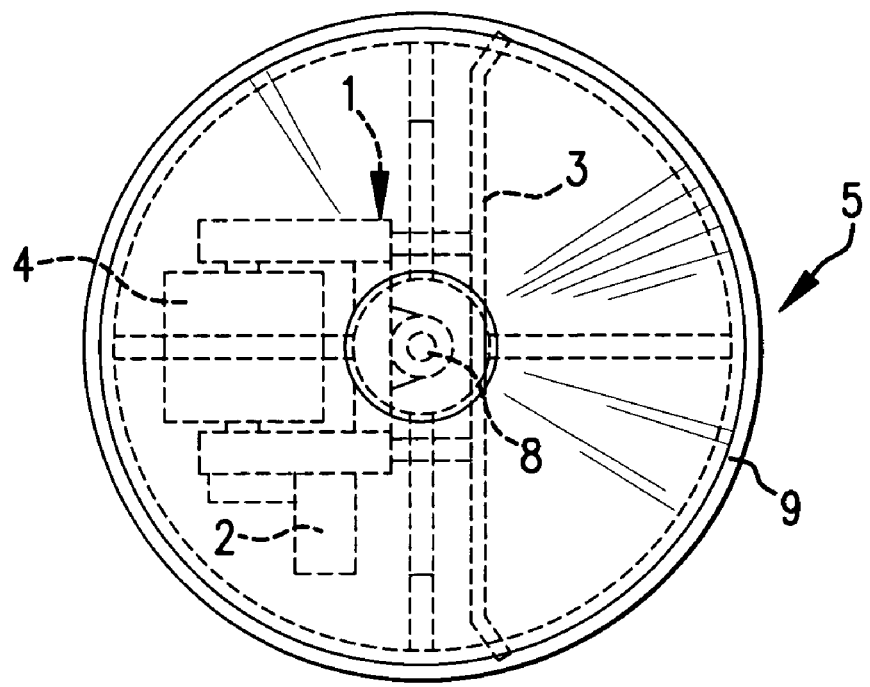
FIG. 1 is a plan view of the unmanned vehicle comprising one rotatable propelling member.
Figure 2:
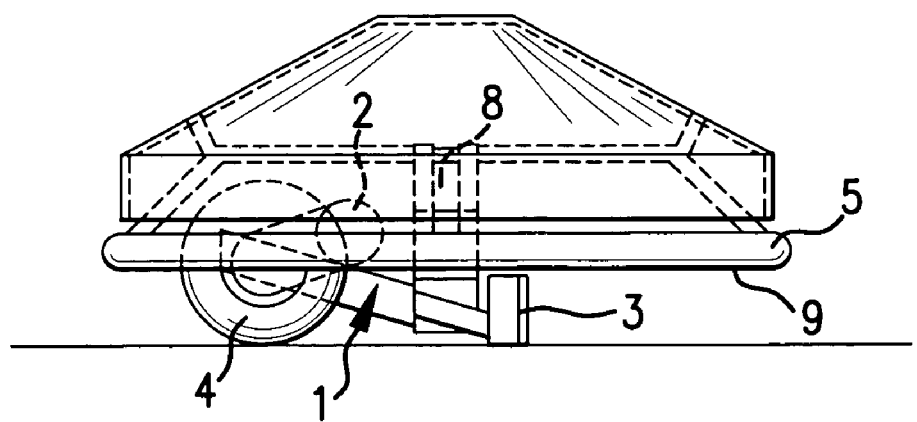
FIG. 2 is a side elevational view of the unmanned vehicle of FIG. 1 that comprises one rotatable propelling member.

The unmanned vehicle as shown in FIGS. 1 and 2 consists of a frame 1 which is provided with a propelling unit 2 and a scraper or manure slide 3. The steering unit of the unmanned vehicle is constituted by propelling unit 2, which propelling unit 2 comprises a rotatable wheel 4. As shown in the drawings, a particularly compact vehicle is provided which has moreover an excellent maneuverability. On frame 1 are also disposed a wall following means 5 which, in this embodiment, comprises a wheel 9 which is freely rotatable about a vertical axle 8.

When operating, the vehicle is propelled by wheel 4. When wall following means 5 touches an obstacle, such as a cow's leg, this results in a resultant force on the vehicle, which causes the vehicle to travel around the obstacle. Wall following means 5 may also be used for following a wall. In that case the vehicle is constantly caused to travel a direction towards the wall. Subsequently there is exerted by the wall a reactive force on the wall following means in the direction away from the wall. As a result thereof the vehicle travels in a straight line along the wall, while wall following means 5 remains in contact with the wall.

Figure 3:
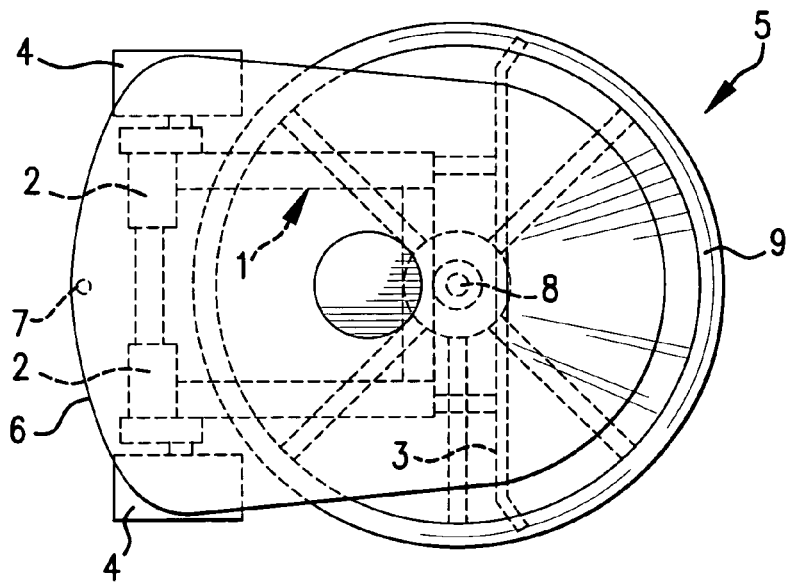
FIG. 3 is a plan view of the unmanned vehicle comprising two independently driven propelling members.
Figure 4:
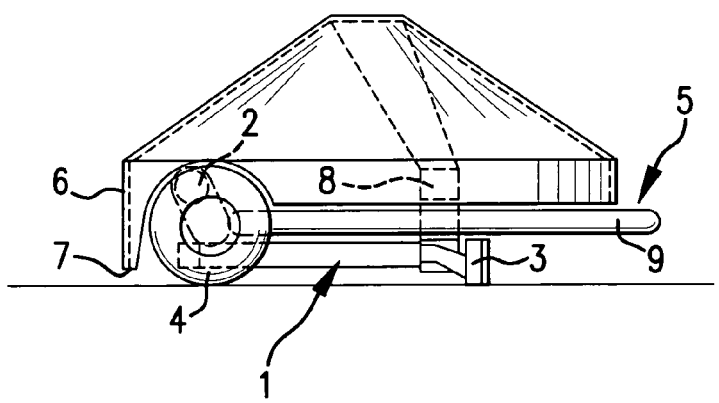
FIG. 4 is a side elevational view of the unmanned vehicle of FIG. 3 that comprises two independently driven propelling members.

FIGS. 3 and 4 show another embodiment of its unmanned vehicle, in which parts corresponding to those of the first embodiment are indicated by a the same reference numerals. The vehicle is furthermore provided with a bracket or bumper 6 which not only protects the vehicle against obstacles, but also ensures that scraper or manure slide 3 does not move too far away from the stable floor. The anti-bumping sensor 7 is disposed on bracket or bumper 6 for detecting movements during which the manure slide moves away from the stable floor.

The way of moving and functioning of wall following means 5 is identical to that described with reference to the embodiment shown in FIGS. 1 and 2. Maneuvering the vehicle is possible by varying the drive torque or the peripheral velocity of wheels 4. When the anti-bumping sensor 7 detects that the scraper or manure slide 3 has moved away from the underlying surface (which, if concrete, will contain reinforcement rods that function as guidance means for orientation means in the vehicle), the unmanned vehicle is caused to move in an opposite direction. In practice the anti-bumping sensor 7 may be constituted by a switch which is connected to propelling unit 2 so that the propelling unit causes the vehicle to move in an opposite direction in order to prevent the vehicle from bumping.

Figure 5:
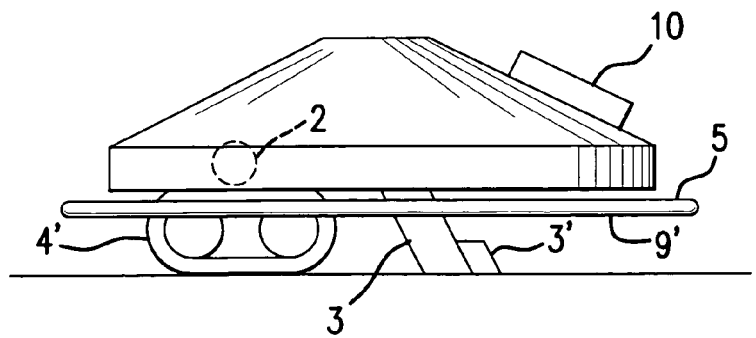
FIG. 5 is a view similar to FIG. 2 to indicate the presence of components described herein but not otherwise shown in the drawings.

FIG. 5 is similar to FIG. 2 but includes components that, although described herein, are not otherwise in the drawings. Such components are depicted diagrammatically. In FIG. 5, propelling unit 2 comprises caterpillar tracks 4'. In combination with a scraper or manure slide 3, a brush 3' may be provided which, in FIG. 5, also represents a spraying unit. Although the manure displacement means may comprise at least one manure slide 3 or one brush 3' or one spraying unit 3' or a combination thereof, as set forth above, the major amount of weight of the vehicle always bears on the manure displacement means, whatever its form, by the appropriate utilization of structural means therefor well within the skill of the art.

Although I have disclosed the preferred embodiments of my invention, it is to be understood that it is capable of other adaptations and modifications within the scope of the appended claims.

I claim:

1. An unmanned non-submersible vehicle for displacing manure which comprises a steering unit for steering the vehicle, a frame, a propelling unit in the vehicle for propelling the vehicle in a non-liquid, air environment, and a manure displacing means for displacing manure, said manure displacing means being non-rotatable and providing support for a major part of the vehicle's weight.

2. A vehicle in accordance with claim 1, comprising protective facilities to protect the vehicle against obstacles.

3. A vehicle in accordance with claim 2, wherein said protective facilities comprise a bumper.

4. A vehicle in accordance with claim 2, wherein said protective facilities comprise wall following means.

5. A vehicle in accordance with claim 2, wherein said protective facilities comprise positioning means for determining the position of an obstacle relative to the vehicle.

6. A vehicle in accordance with claim 5, wherein said positioning means comprises a clinometer.

7. A vehicle in accordance with claim 5, wherein said positioning means comprises an accelerometer.

8. A vehicle in accordance with claim 5, wherein said positioning means includes signal producing means that actuates said steering unit.

9. A vehicle in accordance with claim 1, wherein said steering unit comprises guidance means, said guidance means comprising following means for detecting and following a wall.

10. A vehicle in accordance with claim 9, wherein said following means substantially surrounds and is at least in part supported by said manure displacing means.

11. A vehicle in accordance with claim 9, wherein said following means comprises a freely rotating substantially circular element.

12. A vehicle in accordance with claim 11, wherein said circular element comprises a wheel.

13. A vehicle in accordance with claim 11, wherein said circular element comprises a disc.

14. A vehicle in accordance with claim 11, wherein said circular element comprises a ring.

15. A vehicle in accordance with claim 1, comprising orientation means for determining a relative position of the vehicle.

16. A vehicle in accordance with claim 1, comprising orientation means that controls the vehicle so that it travels along a predetermined course.

17. A vehicle in accordance with claim 1, wherein said steering unit comprises orientation means, said orientation means comprising a compass.

18. A vehicle in accordance with claim 1, wherein said steering means comprises orientation means which includes a gyroscope.

19. A vehicle in accordance with claim 1, wherein said steering unit comprises orientation means which includes an air level device.

20. A vehicle in accordance with claim 1, wherein said steering unit comprises an orientation means which includes a clinometer.

21. A vehicle in accordance with claim 1, wherein said steering unit comprises orientation means which includes an acceleratormeter.

22. A vehicle in accordance with claim 1, wherein said steering unit comprises guidance means which includes following means for following the edge of a cubicle.

23. A vehicle in accordance with claim 1, wherein said manure displacing means comprises a brush.

24. A vehicle in accordance with claim 1, wherein said manure displacing means comprises a manure slide.

25. A vehicle in accordance with claim 1, wherein said manure displacing means comprises a spraying unit.

26. An unmanned vehicle for displacing manure which comprises a steering unit for steering the vehicle, a frame, a propelling unit for propelling the vehicle, and a manure displacing means for displacing manure, said manure displacing means being non-rotatable and providing support for a major part of the vehicle's weight, the vehicle further comprising anti-bumping means which functions to prevent said manure displacing means from moving too far from a floor by which it is supported.

27. A vehicle in accordance with claim 26, wherein said anti-bumping means comprises a bumper.

28. A vehicle in accordance with claim 26, wherein said anti-bumping means comprises a bracket.

29. A vehicle in accordance with claim 26, wherein said anti-bumping means comprises an anti-bumping sensor for performing the function of detecting movements of said manure displacing means away from a floor which supports the vehicle, coupling means coupling said anti-bumping sensor to said propelling unit.

30. An unmanned vehicle for displacing manure which comprises a steering unit for steering the vehicle, a frame, a propelling unit for propelling the vehicle, and a manure displacing means for displacing the manure, said manure displacing means being fitted in the vehicle so that said manure displacing means supports the vehicle while it is operating, said steering means comprising guidance means, said guidance means comprising following means for detecting and following a wall, said following means comprising a freely rotating substantially circular element.

31. A vehicle in accordance with claim 30, wherein said circular element comprises a wheel.

32. A vehicle in accordance with claim 30, wherein said circular element comprises a disc.

33. An unmanned non-submersible vehicle for displacing manure which comprises a steering unit for steering the vehicle, a frame, a propelling unit arranged in the vehicle to propel the vehicle along a floor in an above liquid, air environment, a manure displacing means for displacing the manure, said manure displacing means being disposed in the vehicle so that said manure displacing means bears on said floor and provides major support for the vehicle while it is operating, and anti-bumping means which functions to prevent said manure displacing means from moving too far from said floor on which it is supported.

34. A vehicle in accordance with claim 33, wherein said anti-bumping means comprises a bumper.

35. A vehicle in accordance with claim 33, wherein said anti-bumping means comprises a bracket.

36. An unmanned vehicle for displacing manure which comprises a steering unit for steering the vehicle, a frame, a propelling unit for propelling the vehicle, and a manure displacing means for displacing the manure, said manure displacing means being non-rotatable and providing support for a major part of the vehicle's weight, first supporting means and second supporting means engaging an underlying floor and supporting said frame from said floor, said first supporting means and said second supporting means both being turnable relative to the underlying floor, said first supporting means and said second supporting means being located in a substantially vertical plane and being coupled to said propelling unit, the total weight of the vehicle being borne by said first supporting means, said second supporting means and said manure displacing means.

37. A vehicle in accordance with claim 36, wherein said propelling unit includes said steering unit which consists of said first supporting means or said second supporting means or both and comprises at least one rotatable propelling member.

38. An unmanned vehicle for displacing manure which is disposed in an air environment, the vehicle comprising a steering unit for steering the vehicle, a frame, a propelling unit for propelling the vehicle, and a manure displacing means for displacing the manure, said manure displacing means being non-rotatable and providing support for a major part of the vehicle's weight, said propelling unit comprising at least two independently driven propelling members.

39. A vehicle in accordance with claim 38, wherein each of said propelling members comprises a wheel.

40. An unmanned non-submersible vehicle for displacing manure from an a non-submerged area wherein air breathing animals may be present which comprises a frame carrying a propelling unit and which is substantially entirely supported by two rotatable endless members and manure displacing means affixed to said vehicle forward of said rotatable endless members, said propelling unit not being connected to an external power source during the vehicle's operations, the vehicle further comprising, orientation means, steering means and protective means coupled by coupling means to said propelling unit, whereby the vehicle's course of travel within said area is controlled by the vehicle and the vehicle is prevented from colliding with obstacles and animals in said area.

41. A vehicle in accordance with claim 40, wherein said rotatable endless members comprise wheels and the center of gravity of said vehicle is between said wheels and said manure displacing means.

42. An unmanned non-submersible vehicle for displacing manure which comprises a steering unit for steering the vehicle, a frame, a propelling unit for propelling the vehicle carried by said frame, and a manure displacing means for displacing the manure carried by said frame, said manure displacing means being non-rotatable and bearing the major part of the vehicle's weight while the vehicle is operating.

43. A vehicle in accordance with claim 42, wherein said propelling unit is self contained in the vehicle and is not connected to an external power source while the vehicle is operating.

44. An unmanned vehicle for displacing manure which comprises a steering unit for steering the vehicle, a frame, a propelling unit for propelling the vehicle, a manure displacing means for displacing manure, said manure displacing means being fitted in the vehicle so that said manure displacing means supports the vehicle while it is operating, orientation means that controls the vehicle so that it travels along a predetermined course, said course being determined by guidance means which comprise apertures in a floor over which the vehicle is traveling.

45. An unmanned vehicle for displacing manure which comprises a steering unit for steering the vehicle, a frame, a propelling unit for propelling the vehicle, a manure displacing means for displacing the manure, said manure displacing means being fitted in the vehicle so that said manure displacing means supports the vehicle while it is operating, and orientation means that controls the vehicle so that it travels along a predetermined course, said course being determined by guidance means that comprises reinforcement in a concrete floor over which the vehicle travels.

46. An unmanned vehicle for displacing manure which comprises a steering unit for steering the vehicle, a frame, a propelling unit for propelling the vehicle, a manure displacing means for displacing the manure, said manure displacing means being fitted in the vehicle so that said manure displacing means supports the vehicle while it is operating, and orientation means that controls the vehicle so that it travels along a predetermined course, said course being determined by guidance means which comprises an electrically conducting wire in which an electrical current is flowing.

47. An unmanned vehicle for displacing manure which comprises a steering unit for steering the vehicle, a frame, a propelling unit for propelling the vehicle, and a manure displacing means for displacing the manure, said manure displacing means being fitted in the vehicle so that said manure displacing means supports the vehicle while it is operating, said steering unit comprising guidance means which includes following means for detecting and following a wall, the vehicle being substantially circular when viewed from above, said following means being disposed substantially proximate the vehicle's circumference.

48. An unmanned vehicle for displacing manure which comprises a steering unit for steering the vehicle, a frame, a propelling unit for propelling the vehicle, and a manure displacing means for displacing the manure, said manure displacing means being fitted in the vehicle so that said manure displacing means supports the vehicle while it is operating, said steering unit comprising guidance means which comprises following means for detecting and following a wall, said following means substantially surrounding and at least in part being supported by said manure displacing means.

49. An unmanned vehicle for displacing manure which comprises a steering unit for steering the vehicle, a frame, a propelling unit for propelling the vehicle, a manure displacing means for displacing the manure, said manure displacing means being fitted to the vehicle so that said manure displacing means supports said vehicle while it is operating, and an anti-bumping means which functions to prevent said manure displacing means from moving too far from a floor by which it is supported, said anti-bumping means comprising an anti-bumping sensor for performing the function of detecting movements of said manure displacing means away from said floor which supports the vehicle, and coupling means coupling said anti-bumping means to said propelling unit.

50. An unmanned vehicle for displacing manure which comprises a steering unit for steering the vehicle, a frame, a propelling unit for propelling the vehicle, and a manure displacing means for displacing the manure, said manure displacing means being non-rotatable and providing support for a major part of the vehicle's weight, said propelling unit comprising at least two independently driven propelling members, each of said propelling members comprising a caterpillar track.

51. An unmanned vehicle which comprises a steering unit for steering the vehicle, a frame, a propelling unit for propelling the vehicle, and a manure displacing means for displacing manure, said manure displacing means being non-rotatable and providing support for a major part of the vehicle's weight, orientation means that controls the vehicle so that it travels along a predetermined course, said course being determined by guidance means which comprise apertures in the floor over which the vehicle is traveling.

52. An unmanned vehicle which comprises a steering unit for steering the vehicle, a frame, a propelling unit for propelling the vehicle, and a manure displacing means for displacing manure, said manure displacing means being non-rotatable and providing support for a major part of the vehicle's weight, orientation means that controls the vehicle so that it travels along a predetermined course, said course being determined by guidance means which comprises reinforcement in a concrete floor over which the vehicle travels.

53. An unmanned vehicle which comprises a steering unit for steering the vehicle, a frame, a propelling unit for propelling the vehicle, and a manure displacing means for displacing manure, said manure displacing means being non-rotatable and providing support for a major part of the vehicle's weight, orientation means that controls the vehicle so that it travels along a predetermined course, said course being determined by guidance means which comprises an electrically conductive wire in which an electrical current is flowing.

54. An unmanned vehicle for displacing manure which comprises a steering unit for steering the vehicle, a frame, a propelling unit for propelling the vehicle, and a manure displacing means for displacing manure, said manure displacing means being non-rotatable and providing support for a major part of the vehicle's weight, said steering unit comprising guidance means, said guidance means comprising means for detecting and following a wall, the vehicle being substantially circular when viewed from above, said means for detecting and following a wall being disposed substantially proximate the vehicle's circumference.

55. An unmanned vehicle for displacing manure which comprises a steering unit for steering the vehicle, a frame, a propelling unit for propelling the vehicle, and a manure displacing means for displacing manure, said manure displacing means being non-rotatable and providing support for a major part of the vehicle's weight, the vehicle further comprising protective facilities to protect the vehicle against obstacles, said protective facilities comprising a sensor for detecting cows.

* * * * *